United States Patent [19]

Miyagawa et al.

[11] Patent Number: 4,748,676

[45] Date of Patent: May 31, 1988

[54] PATTERN ROTATION ANGLE DETECTING SYSTEM

[75] Inventors: Michiaki Miyagawa; Yutaka Ishizaka, both of Kanagawa, Japan

[73] Assignee: Fuji Electric Co., Ltd., Kawasaki, Japan

[21] Appl. No.: 49,603

[22] Filed: May 14, 1987

[30] Foreign Application Priority Data

May 16, 1986 [JP] Japan .................................. 61-110685

[51] Int. Cl.$^4$ ............................................. G06H 9/32
[52] U.S. Cl. ........................................ 382/46; 382/28; 340/727; 364/559
[58] Field of Search ................. 382/44, 46, 48, 28, 382/8; 340/727; 364/559, 564; 356/141, 144, 152

[56] References Cited

U.S. PATENT DOCUMENTS

| | | | |
|---|---|---|---|
| 4,435,837 | 3/1984 | Abernathy | 364/559 |
| 4,499,597 | 2/1985 | Alves | 382/48 |
| 4,630,225 | 12/1986 | Hisano | 364/559 |
| 4,680,802 | 7/1987 | Nishida et al. | 382/8 |

OTHER PUBLICATIONS

Yamasaki et al., "Basic Equation of Automatic Normalizer for Character Patterns Using Moments", *Electronics and Communications in Japan*, vol. 55-D, No. 5, 1972.

*Primary Examiner*—Leo H. Boudreau
*Assistant Examiner*—Joseph Mancuso
*Attorney, Agent, or Firm*—Finnegan, Henderson, Farabow, Garrett & Dunner

[57] ABSTRACT

A pattern rotation angle detecting system in which the angle of rotation of a pattern is detected according to the image data obtained by binary-coding and spatially-dividing the image signal of the pattern. The system comprises an extracting circuit for extracting the area and the moment of inertia of the image of the pattern directly from the binary-coded image data; a memory for storing the image data; and a processing circuit for obtaining the center of gravity of the image of the pattern using the area and the moment of inertia, circularly scanning the memory in such a manner that a circle is described having a center at the center of gravity, extracting arcuate segments, selecting as a reference arcuate segment one of the arcuate segments which satisfies predetermined conditions, mating a sample under detection with a standard sample using the properties of the reference arcuate segment and at least one arcuate segment from each side of the reference segments, and detecting the angle of rotation from the angle defined by the angle formed by a rotation angle reference point of the reference arcuate segment with respect to a predetermined reference line.

7 Claims, 5 Drawing Sheets (a)
| $P_{Si}$ | $P_{S1}$ | $P_{S2}$ | $P_{S3}$ | $P_{S4}$ | $P_{S5}$ | $P_{S6}$ | $P_{S7}$ | $P_{S8}$ |
|---|---|---|---|---|---|---|---|---|
| $\theta_{Si}$ | $\theta_{S1}$ | $\theta_{S2}$ | $\theta_{S3}$ | $\theta_{S4}$ | $(\theta_{S5})$ | $\theta_{S6}$ | $\theta_{S7}$ | $\theta_{S8}$ |
| $C_{Si}$ | 1 | 0 | 1 | 0 | 1 | 0 | 1 | 0 |

(b)
| $P_{Xi}$ | $P_{X1}$ | $P_{X2}$ | $P_{X3}$ | $P_{X4}$ | $P_{X5}$ | $P_{X6}$ | $P_{X7}$ | $P_{X8}$ |
|---|---|---|---|---|---|---|---|---|
| $\theta_{Xi}$ | $\theta_{X1}$ | $\theta_{X2}$ | $\theta_{X3}$ | $\theta_{X4}$ | $\theta_{X5}$ | $\theta_{X6}$ | $\theta_{X7}$ | $\theta_{X8}$ |
| $C_{Xi}$ | 0 | 1 | 0 | 1 | 0 | 1 | 0 | 1 |

PATTERN ROTATION ANGLE DETECTING SYSTEM

BACKGROUND OF THE INVENTION

The present invention relates generally to an apparatus in which an objective pattern is extracted by an image sensor, such as a television camera, and then subjected to image processing to detect a rotational angle in order to inspect or recognize the objective pattern.

One conventional detection system utilizes a method, known as the moment of inertia method of calculation, in which the optically-sensed image of a pattern is binary-coded, and in which a main axis and a center of gravity of an equivalent ellipse are obtained from calculations using the linear moment M, quadratic moment $I_x$, $I_y$, synergistic moment $I_{xy}$ and an area A of the binary-coded image.

Thus, an angle of rotation $\theta$ and a center of gravity $P_G(P_{GX}, P_{GY})$ are calculated according to the following expressions (1)-(3):

$$\tan 2\theta = 2I_{xy}/(I_y - I_x) \quad (1)$$

$$P_{GX} = M_x/A \quad (2)$$

$$P_{GY} = M_y/A \quad (3)$$

where the various symbols are defined as follows:
- $M_x$: the linear moment of the pattern with respect to the x-axis;
- $M_y$: the linear moment of the pattern with respect to the y-axis;
- $I_x$: the quadratic moment of the pattern with respect to the x-axis;
- $I_y$: the quadratic moment of the pattern with respect to the y-axis;
- $I_{xy}$: the synergistic moment of the pattern;
- $P_{GX}$: the x-distance of the center of gravity;
- $P_{GY}$: the y-distance of the center of gravity; and
- A: the area of the objective pattern.

Using this moment of inertia method of calculation, the angle of rotation $\theta$ can be detected with relatively high accuracy for an elongated objective pattern, but not for an objective pattern which is more square or circular. In square or circular patterns, the quadratic moments $I_x$ and $I_y$ have similar values and very small errors in quantization of the pattern are magnified when the denominator at the right-hand side of the above-mentioned expression (1) approaches zero. Therefore, if the rotation of an objective pattern is normalized by using an angle of rotation obtained by the moment of inertia method described above, errors could occur due to the introduction of errors based on shape-dependent calculations rendering any further pattern inspection and recognition of little practical use.

SUMMARY OF THE INVENTION

It is an object of the present invention to provide a system for detecting a rotational angle of an objective pattern in which accurate pattern detection can be achieved without shape-dependent errors.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, the system for detecting a rotational angle of a two-dimensional pattern converted into binary picture information, comprises memory means for storing the picture information; extracting means for extracting an area and a moment of inertia of the objective pattern from the picture information; center of gravity detection means for determining a center of gravity of the objective pattern from the area and the moment of inertia of the objective pattern; circular scanning means for scanning the stored picture information to describe a circle having a predetermined radius and a center at the center of gravity; arcuate segment calculating means for calculating a plurality of arcuate segments by using a reference arcuate segment having predetermined characteristics and by using at least one arcuate segment on each side of the reference arcuate segment, the plurality of arcuate segments being used to mate the pattern with a standard sample; and final calculation means for detecting the rotational angle, the angle defined by an angle formed by a rotation angle reference point of said reference arcuate segment with respect to a predetermined reference line.

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Figure 1:
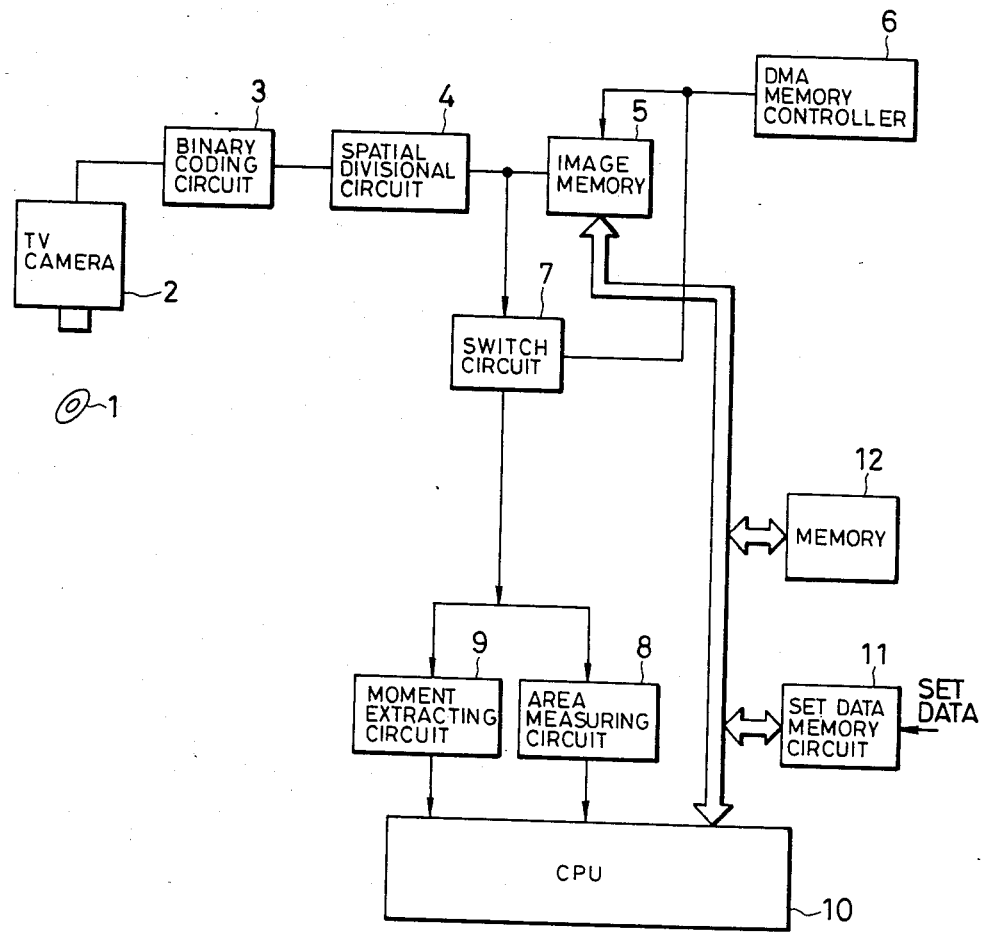
FIG. 1 is a block diagram illustrating a pattern rotation angle detecting system in accordance with a preferred embodiment of the present invention.

Reference will now be made in detail to the present preferred embodiments of the invention, examples of which are illustrated in the accompanying drawings in which like reference characters refer to corresponding elements.

One example of a pattern rotation angle detecting system according to this invention is shown in FIG. 1 and comprises a two-dimensional image pickup device 2, such as a television camera, for taking a picture of a sample 1 under detection, a binary-coding circuit 3, a spatial division circuit 4, an image memory 5, a DMA memory controller 6, a switch circuit 7, an area measuring circuit 8, a linear moment extracting circuit 9, an arithmetic and control unit (CPU) 10, a set data memory circuit 11, a memory 12, and a CPU bus 13.

Figure 2:
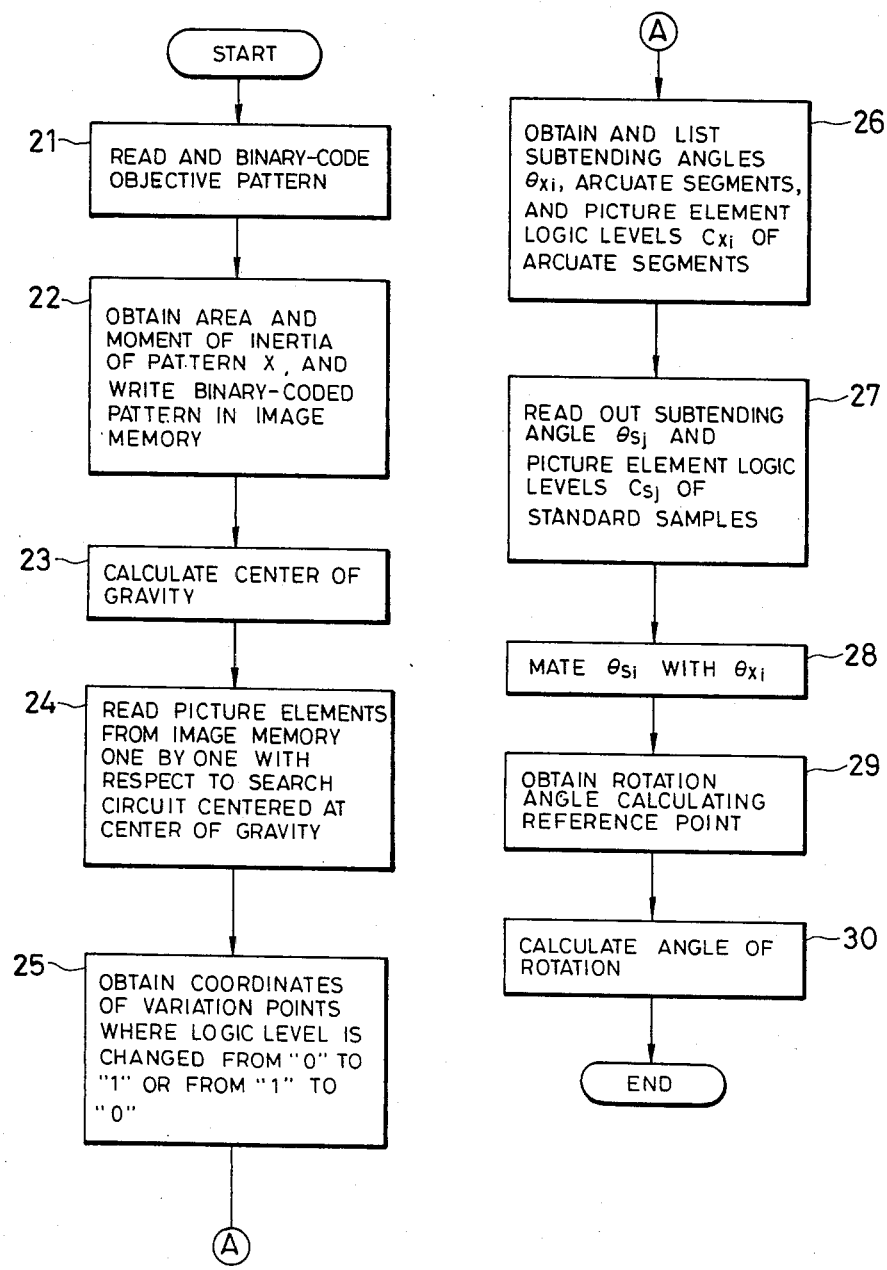
FIG. 2 is a flowchart illustrating the operation of the system shown in FIG. 1.

The operation of the system of the present invention will be described with reference to FIG. 2. As shown in step 21 of FIG. 2, the detection according to this invention starts with the sample 1 to be detected being sensed by the television camera 2 and converted into binary, that is, black and white, data by the binary coding circuit 2. The binary data is then spatially divided in two dimensions into picture elements by the spatial division circuit 4, for example, 256×256 picture elements. The picture elements are then stored in the image memory 5, which is of bit frame type. This operation is executed during a direct memory access (DMA) period. In this operation, the image memory 5 is controlled by the DMA memory controller 6.

During the DMA period, and as shown in step 22, the picture data processed by the spatial division circuit 4 is applied through the switch circuit 7 to the area measuring circuit 8 and the moment extracting circuit 9, so that an area A is measured and the linear moments $M_x$, $M_y$ are obtained. These numerical data are read by the CPU 10 and stored in the memory 12 after the DMA period.

Next, at step 23, after reading the numerical data A, $M_x$ and $M_y$, the CPU 10 calculates the coordinates $P_{GX}$ (x,y) of the center of gravity of the pattern X according to the above-described expression (2). Next, as shown in step 24, the CPU 10 reads a search radius R out of the set data memory circuit 11 which contains previously stored data representative of parameters necessary for angle detection which have been obtained in advance using a standard sample S. The CPU 10 reads picture element logic level one by one by scanning the image memory 5 circularly in a predetermined direction, for example, a clockwise direction, in such a manner that a circle having the radius R is described with its center at a center of gravity obtained for the immediately preceding objective pattern and compares the logic level of the present picture element being scanned with that of the preceding picture element. That is, the CPU 10 detects a picture element as being a variation point $P_i$ when the logic level of the picture element is different from that of the preceding picture element.

More specifically, as shown in step 25, if the logic level of a picture element scanned is "one" (or "zero") when the logic level of the preceding picture element was "0" or ("1"), the former picture element is determined to be a variation point $P_i$. The coordinates $P_i$ (x, y) and the logic level $C_i$ ("1" or "0") of that point are stored in the memory 12. The operation is repeatedly carried out until the scanning circle is completed.

The scanning circle of the sample X is determined as follows. First, the positional deviation ($\Delta x$, $\Delta y$) between the center of gravity of the pattern X under detection and the center of gravity of the standard sample are obtained from the following expression (4) using the coordinates $P_{GX}$ (x, y) of the center of gravity of the pattern X and the coordinates $P_{GS}$ (x, y) of the center of gravity of the standard sample:

$$\left. \begin{array}{l} \Delta x = P_{GX}(x) - P_{GS}(x) \\ \Delta y = P_{GX}(y) - P_{GS}(y) \end{array} \right\} \quad (4)$$

The data $\Delta x$ and $\Delta y$ are added to the coordinates of a standard search circle.

The radius R for the circular scan is set to equal the value determined through a circular scanning operation with a standard sample having center of gravity coordinates $P_{GS}$(x, y). The x- and y-coordinates of all of the points obtained in the circular scan using a searching circle with the radius R are listed in tabular form and stored in the set data memory circuit 11, as standard search circular coordinates.

Figures 3, 5:
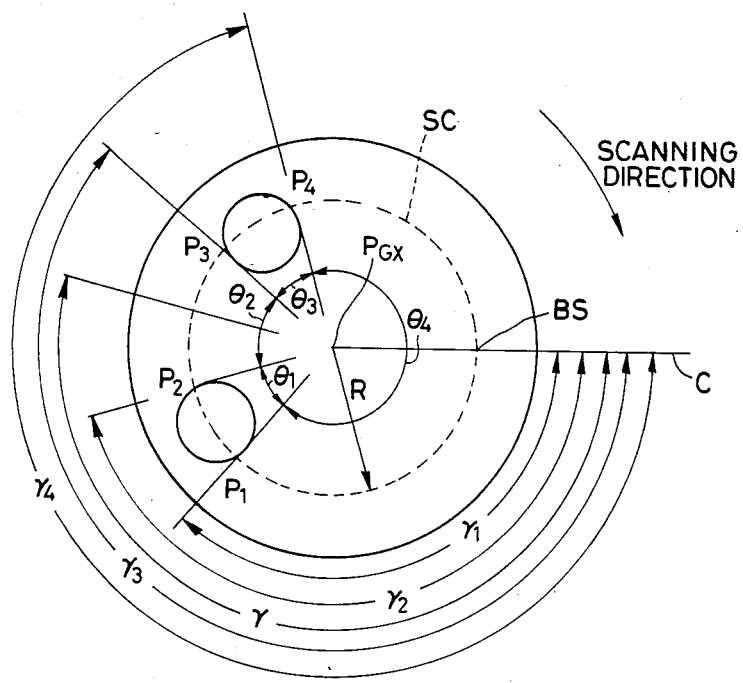
FIG. 3 is an explanatory diagram illustrating the principle of the present invention.
FIG. 5 is an explanatory diagram illustrating the results of the mating operation of FIG. 4.

As shown in FIG. 3, the coordinates and logic levels of the variation points on a scanning circle SC having a radius R are extracted, thus forming, arcs $\widehat{P_1P_2}$, $\widehat{P_2P_3}$, $\widehat{P_3P_4}$ and $\widehat{P_4P_1}$, each having two adjacent variation points at both ends, which will be referred to as "arcuate segments."

Next, at step 26 of FIG. 2, the CPU 10 calculates an angle formed by lines connected between the center of gravity of the scanning circle and both ends of each of the arcuate segments (hereinafter referred to as "a subtending angle $\theta_i$"). As shown in FIG. 3, the arcuate segment $\widehat{P_1P_2}$ has a subtending angle $\theta_1$, the arcuate segment $\widehat{P_2P_3}$ has a subtending angle $\theta_2$, etc. The variation point coordinates $P_i$(x, y), the subtending angles $\theta_i$, and the picture element logic levels $C_i$ are listed and stored in the memory 12. If necessary, absolute angles $\gamma_i$, formed between a reference line C (for example, a line connecting the center of gravity and the television camera's horizontal scanning line), are also listed.

The above-described operation is also applied to the standard sample in advance, and the list data from the standard sample are stored in the set data memory circuit 11. In step 27 of FIG. 2, the CPU 10 reads the list data out of the memory circuit 11 and, in step 28, mates the arcuate segments of the sample under detection with those of the standard sample. This mating operation is carried out as shown in FIG. 4.

Figure 4:
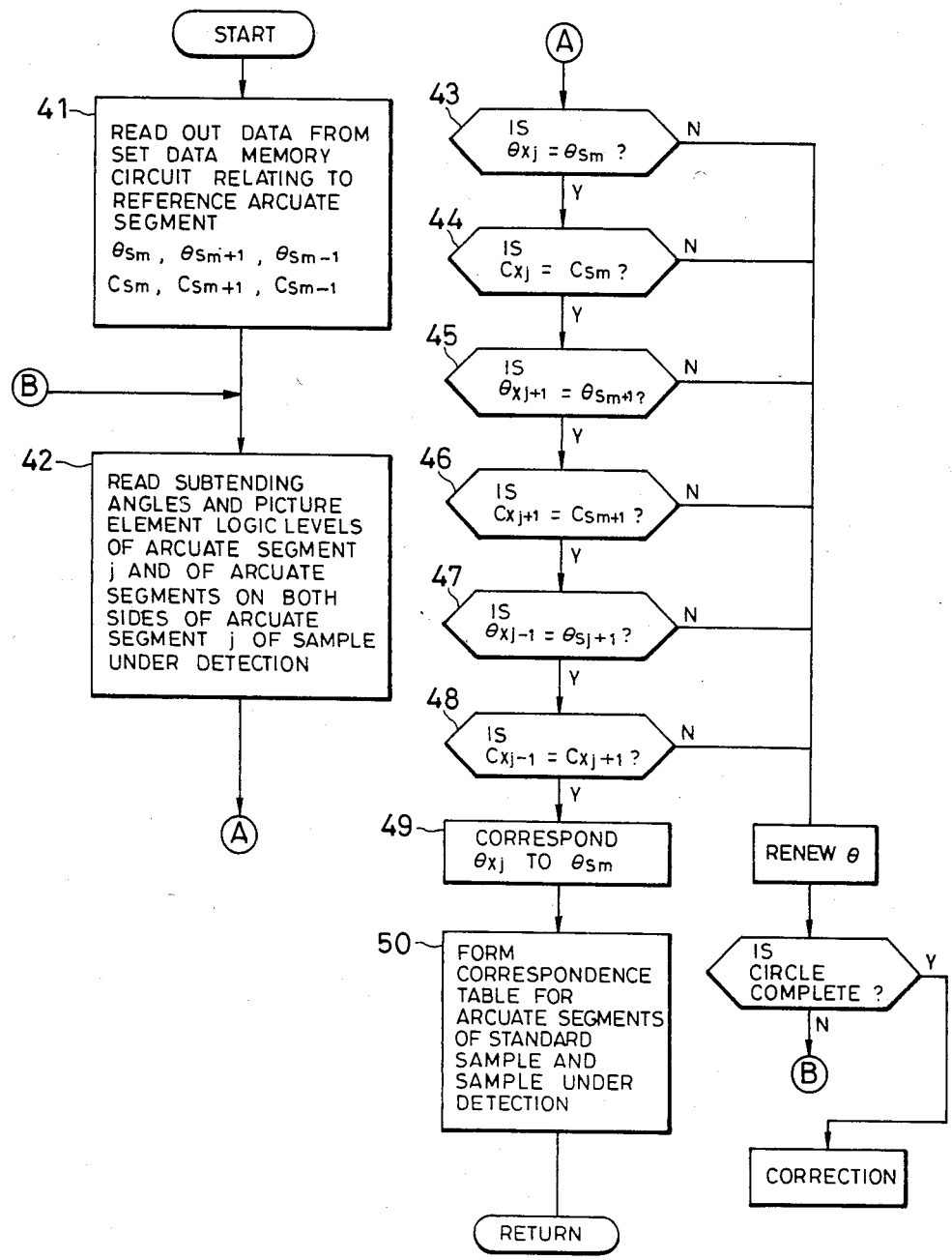
FIG. 4 is an explanatory diagram illustrating the principle of a mating operation used by the system in accordance with the present invention.

As illustrated in FIG. 4, in the mating operation an arcuate segment of the standard sample S which has the maximum (or minimum) subtending angle is employed as a reference arcuate segment in order to obtain an arcuate segment of the sample under detection which corresponds to the reference arcuate segment. For this mating operation, the subtending angle $\theta_{sm}$ of the reference arcuate segment, the picture element logic level $C_{sm}$ of the reference arcuate segment, the subtending angles $\theta_{sm+1}$ and $\theta_{sm-1}$, and the picture element logic levels $C_{sm+1}$ and $C_{sm-1}$ of the arcuate segments on either side of the reference arcuate segment are obtained and stored in the memory circuit 11 in the form of set data for the reference arcuate segment. Therefore, in the comparison, as shown in step 41 of FIG. 4, first the data from the reference arcuate segment are read out of the set data memory circuit 11. Then, in step 42, the subtending angles $\theta X_j$ and the picture element logic levels $C_{Xj}$ of the arcuate segments of the sample under detection are read out. Using these values, the arcuate segment of the sample under detection which corresponds to the reference arcuate segment can be calculated by using the following expression (5), as shown in steps 43 and 44 of FIG. 4, and expression (6), as shown in steps 45-48 of FIG. 4.

$$\left. \begin{array}{l} \theta_{Xj} \approx \theta_{sm} \\ C_{Xj} = C_{Xm} \end{array} \right\} \quad (5)$$

$$\left. \begin{array}{l} \theta_{Xj+1} \approx \theta_{sm+1}, \ C_{Xj+1} = C_{sm+1} \\ \theta_{Xj-1} \approx \theta_{sm-1}, \ C_{Xj-1} = C_{sm-1} \end{array} \right\} \quad (6)$$

In step 49, the corresponding arcuate segment is extracted. A table illustrating the correspondence between the arcuate segments of the standard sample and the sample under detection is formed in step 50.

An example of a correspondence table is illustrated in FIG. 5. Part (a) of FIG. 5 shows a data list of a standard sample, and part (b) illustrates a data list of the sample under detection. These data lists are related to each other as indicated by the arrows. In FIG. 5, the subtending angles $\theta_{Si}$ and $\theta_{Xi}$ are indicated in simplified form, however, the complete expressions are as follows:

$$\theta_{Si}=P_{Si}P_{Si+1} \quad (7)$$

$$\theta_{Xi}=P_{Xi}P_{Xi+1} \quad (8)$$

In part (a) of FIG. 5, the subtending angle encircled is equal to the reference arcuate segment. In the method described above, the arcuate segments on both sides of the reference arcuate segment are taken into account; however, if the results of the calculations are still insufficient for discrimination, then the arcuate segments next to them may also be utilized in further calculations.

In a second embodiment of the present invention, one of the arcuate segments of the sample under detection having the maximum (or minimum) subtending angle is selected, and is used to determine whether the arcuate segment thus selected is substantially equal to the reference arcuate segment of the standard sample, and if determined equal, then the arcuate segments on both sides of the arcuate segment selected are measured. If these arcuate segments also equal those of the standard sample, then it is determined that the arcuate segment selected corresponds to the reference arcuate segment. In both embodiments, one of the arcuate segments of the standard sample having the maximum (or minimum) subtending angle is selected as the reference arcuate segment, and the data from the arcuate segments on both sides of the arcuate segment are utilized for the mating operation. The mating operation previously described is performed in step 49 of FIG. 4 by presetting the reference arcuate segment in order to extract an arcuate segment of the sample under detection which corresponds to the reference arcuate segment.

If the correspondence between the standard sample and the sample under detection is known, then the angle of rotation of the sample under detection can be readily detected by defining the reference point (or the reference line) of an angle of rotation of the standard sample relative to the reference arcuate segment. The data relating to the relative position are stored as reference point data. For example, if the mid-point of the arcuate segment $\overline{P_2P_3}$, shown in FIG. 3, is defined to be the reference point for angles of rotation, then the absolute angles $\gamma_{Xm}$ and $\gamma_{Xn}$ of an arcuate segment $\overline{P_{Xm}P_{Xn}}$ of the sample X under detection which corresponds to the arcuate segment $\overline{P_2P_3}$ and the mean value $\gamma_X$ of the absolute angles can be used to calculate the angle of rotation of the sample X under detection as shown in step 50 of FIG. 4, where $\gamma_X$ is defined as follows:

$$\gamma_X=(\gamma_{Xm}+\gamma_{Xn})/2 \quad (9)$$

In this method, any one of the arcuate segments or any one of the points, such as $P_1$ or $P_2$, can be utilized for determining the reference point.

Figure 6:
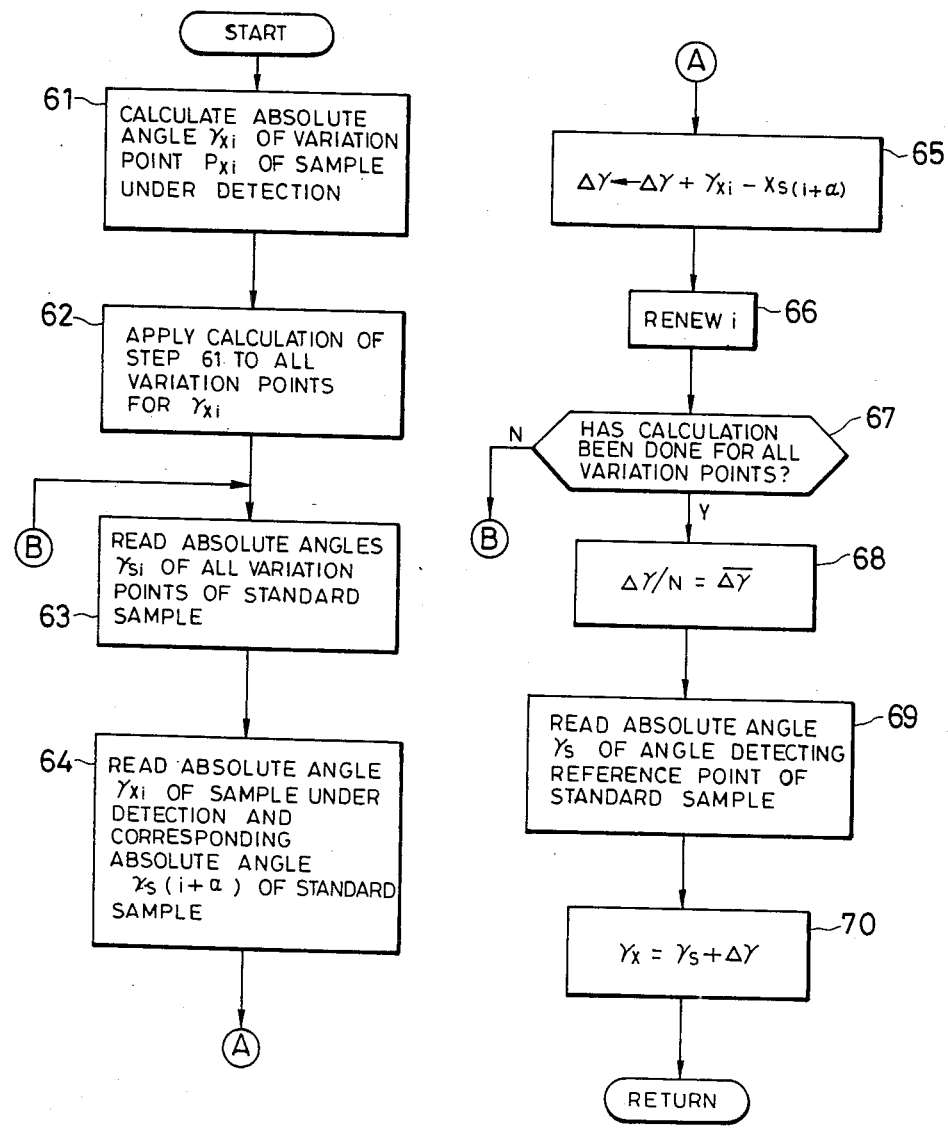
FIG. 6 is a flowchart illustrating the operation of another embodiment of the pattern rotation angle detecting system.

Another embodiment of the rotation angle detecting method of the present invention will be described with reference to FIG. 6. In steps 61 and 62, the absolute angles $\gamma_{Xi}$ of all the variation points $P_{Xi}$ are calculated. The values of the absolute angles and the variation points of the standard sample previously stored in memory circuit 11, are read out by the CPU 10 in step 63. Next, the data of the standard sample are mated with those of the sample under detection. Through the mating operation, a variation point $P_{Xi}$ of the sample X under detection corresponding to the variation point $P_{Si}$ of the standard sample S is determined using the formula:

$$P_{Xi}=P_{S(i+a)}.$$

In step 64, the absolute angles $\gamma_{Xi}$ and $\gamma_{S(i+a)}$ of the two variation points are read and the difference between the absolute angles is calculated thereby to obtain the difference $\Delta\gamma$ between the angles of rotation at the variation points $P_{Xi}$ and $P_{S(i+a)}$ as follows:

$$\gamma=\gamma_{Xi}-\gamma_{S(i+a)} \quad (10)$$

In steps 65–67, the above-described operation is performed for all of the remaining variation points, and, in step 68, the mean value $\overline{\Delta\gamma}$ of the resulting differences $\Delta\gamma$ is calculated as follows:

$$\overline{\Delta\gamma} = \frac{1}{N} \sum_{L=1}^{N} (\gamma_{Xi} - \gamma_{S(i+a)}) \quad (11)$$

This value represents the deviation in the angle of rotation of the pattern under detection. Next, in step 69, the absolute angle $\gamma_S$ from the rotation angle detecting reference point of the standard sample, previously stored in memory circuit 11, is added to the deviation value previously obtained, resulting in a value for the angle of rotation $\gamma_X(=\gamma_S+\overline{\Delta\gamma})$ of the pattern under detection, as shown in step 70.

In this embodiment, the following data is stored in the set data memory circuit 11 in order to perform the previously-described calculations:

(a) the x, y coordinates of the center of gravity of the standard sample;

(b) the search circle radius, R;

(c) the coordinates of the points on the standard search circle having its center located at the coordinates of the center of gravity of the standard sample;

(d) the subtending angles for the arcuate segments;

(e) the picture element logic levels for the arcuate segments;

(f) the sequence and occurrence of the arcuate segments;

(g) the data relating to the subtending angles and the picture element logic levels of the mating reference arcuate segment and the arcuate segments on both its sides; and (h) the data relating to the rotation angle detecting point.

The following advantages results from the use of the pattern rotation angle detecting system of the present invention;

(1) In the system of the invention, the center of gravity of a pattern to be detected is obtained, a search circle having a predetermined radius is described, and the arcuate segments of the search circle are then measured in order to detect the angle of rotation. Therefore, the angle of rotation of a circular pattern and normalization of rotation of an objective pattern can be calculated with greater accuracy when performing pattern recognition or inspection. As a result, the accuracy and determination of the acceptability of the pattern and recognition of the pattern are improved.

(2) Since the standard search circle can be normalized, the deviation and position of the sample under detection can be stably and accurately corrected, and the posture of the sample with respect to a conveying system is less limited, resulting in a reduction of the manufacturing costs of a conveying system.

(3) The circular scanning can be normalized merely by adding the deviation and position from the standard sample of the sample under detection to the stored table of the coordinates of the standard search circle having its center located at the center of gravity. Therefore, the circular scanning speed is increased.

(4) Since the arcuate segments are expressed with respect to the variation point coordinates, the picture element logic levels, and the subtending angles, the amount of necessary processing data is decreased, resulting in high speed processing.

(5) The angle of rotation can be accurately detected by mating the arcuate segments of the sample under detection with the arcuate segments of the standard sample using the subtending angles and the picture element logic levels.

(6) The arcuate segment mating operation can be accurately performed using the arcuate segment of the standard sample having the maximum (or minimum) subtending angle as the reference arcuate segment, and using the subtending angles and the picture element logic levels of the reference arcuate segment and the arcuate segments on both sides of the reference arcuate segment.

(7) Since the rotation angle detecting reference point can be determined irrespective of the reference arcuate segment if necessary and since it is unnecessary for the operator to perform after-treatment for the calculated angle of rotation, there is a greater degree of freedom for the operator to specify the angle detecting reference point resulting in a wide range of application for the system of the present invention.

It will be apparent to those skilled in the art that various modifications and variations can be made in the methods and apparatus of the present invention without departing from the scope or spirit of the invention. Thus, it is intended that the present invention cover the modifications and variations of this invention provided they come within the scope of the appended claims and their equivalents.

What is claimed is:

1. A system for detecting a rotational angle of a two-dimensional pattern converted into binary picture information, comprising:
   memory means for storing said picture information;
   extracting means for extracting an area and a moment of inertia of said objective pattern from said picture information;
   center of gravity detection means for determining a center of gravity of said objective pattern from said area and said moment of inertia of said objective pattern;
   circular scanning means for scanning said stored picture information to describe a circle having a predetermined radius and a center at said center of gravity;
   arcuate segment calculating means for calculating a plurality of arcuate segments from data produced by the circular scanning means, by using a reference arcuate segment having predetermined characteristics and by using at least one arcuate segment on each side of said reference arcuate segment, said plurality of arcuate segments being used to mate said pattern with a standard sample; and
   final calculation means for detecting said rotational angle, said angle defined by an angle formed by a rotation angle reference point of said reference arcuate segment with respect to a predetermined reference line.

2. The system of claim 1, wherein the predetermined characteristics of said reference arcuate segment are determined by using data relating to variation point coordinates, picture element logic levels, and subtending angles.

3. The system of claim 1, wherein said reference arcuate segment has a maximum value of a plurality of values of said subtending angles.

4. The system of claim 1, wherein said reference arcuate segment has a minimum value of a plurality of values of said subtending angles.

5. The system of claim 1, wherein said reference arcuate segment is determined using said standard sample.

6. The system of claims 1, 2, 3, 4, or 5, wherein said rotation angle reference point can be preset.

7. The system of claims 1, 2, 3, 4, or 5, wherein a plurality of coordinates obtained in said circular scanning are normalized for memory access.

* * * * *